United States Patent [19]

Nishiyama

[11] Patent Number: 5,604,844
[45] Date of Patent: Feb. 18, 1997

[54] PRINTING METHOD AND APPARATUS

[75] Inventor: Masaki Nishiyama, Yokohama, Japan

[73] Assignee: Canon Kabushiki Kaisha, Tokyo, Japan

[21] Appl. No.: 474,184

[22] Filed: Jun. 7, 1995

Related U.S. Application Data

[63] Continuation of Ser. No. 994,982, Dec. 22, 1992.

[30] Foreign Application Priority Data

Dec. 25, 1991 [JP] Japan ................................ 3-343284

[51] Int. Cl.$^6$ ........................................... G06K 15/00
[52] U.S. Cl. ............................ 395/111; 395/112
[58] Field of Search .................................. 395/101, 114, 395/105, 111, 112, 113; 400/70, 71

[56] References Cited

U.S. PATENT DOCUMENTS 4,891,769  6/1990  Tasaki ........................ 395/112

FOREIGN PATENT DOCUMENTS

| 62-95278 | 5/1987 | Japan . |
|---|---|---|
| 62-256677 | 11/1987 | Japan . |
| 392371 | 4/1991 | Japan . |
| 3120131 | 5/1991 | Japan . |

OTHER PUBLICATIONS

DeskJet 500 Printer Owner's Manual.
DeskJet 500 Printer Owner's Manual Jun. 1990.

*Primary Examiner*—Arthur G. Evans
*Attorney, Agent, or Firm*—Fitzpatrick, Cella, Harper & Scinto

[57] ABSTRACT

For a paper feed operation, it is determined whether printing printing is being performed. When the printing is not performed, the paper feed is enabled even in the on-line state, thereby omitting a vain key operation. Further, a line feed key and a paper discharge key are set as the same key and a paper discharge stop function is provided, thereby enabling the line feed of a large amount to be executed by a smaller number of key strokes.

12 Claims, 20 Drawing Sheets

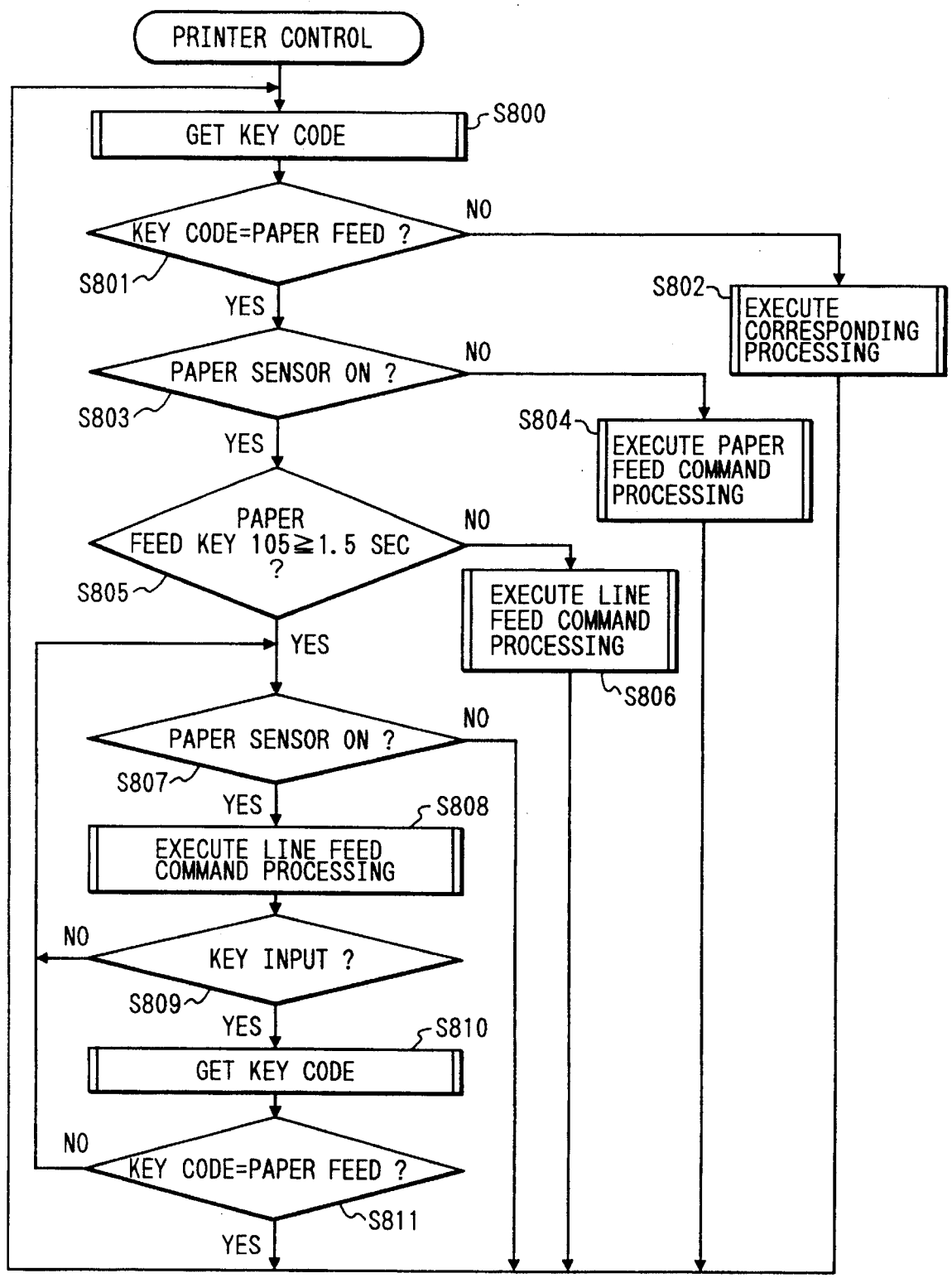

1

PRINTING METHOD AND APPARATUS

This application is a continuation of application Ser. No. 07/994,982, filed Dec. 22, 1992, now abandoned.

BACKGROUND OF THE INVENTION

1. Field of the Invention

The invention relates to a printing apparatus which can feed a paper without shifting to an off-line state for paper feed.

2. Related Background Art

Hitherto, in the printing apparatus with the automatic document feeding function, the automatic document feeding operation is executed by a paper feed key only in the off-line state.

According to the conventional technique, in case of automatically feeding a paper by the paper feed key, complicated operations such that after the printer was once set to the off-line state, the paper feed key is operated and, further, the printer is returned to the on-line state are needed. On the other hand, in case of executing the paper feed by the line feed key, the line feed key must be depressed a few times to tens of times until a print head comes to a desired position, so that it is troublesome.

SUMMARY OF THE INVENTION

According to the invention, there is provided a printing apparatus comprising: printing means for receiving data from a host computer and printing; judging means for judging whether the printing means is printing or not; and key input means for giving a paper feed instruction to the printing means, wherein when the paper feed instruction is given by the key input means, a paper feed control can be executed in accordance with the result of the judging means.

According to the invention, there is also provided a printing apparatus comprising: printing means for receiving data from a host computer and printing; and key input means for giving a paper feed instruction to the printing means, wherein after the paper feed instruction was given by the key input means, a paper feed control can be executed in accordance with a further instruction from the key input means.

BRIEF DESCRIPTION OF THE DRAWINGS

FIG. 13 is a flowchart when a power supply is turned on;

FIG. 25 is a flowchart for a key process on the printer side.

DETAILED DESCRIPTION OF THE PREFERRED EMBODIMENTS

Figure 1:
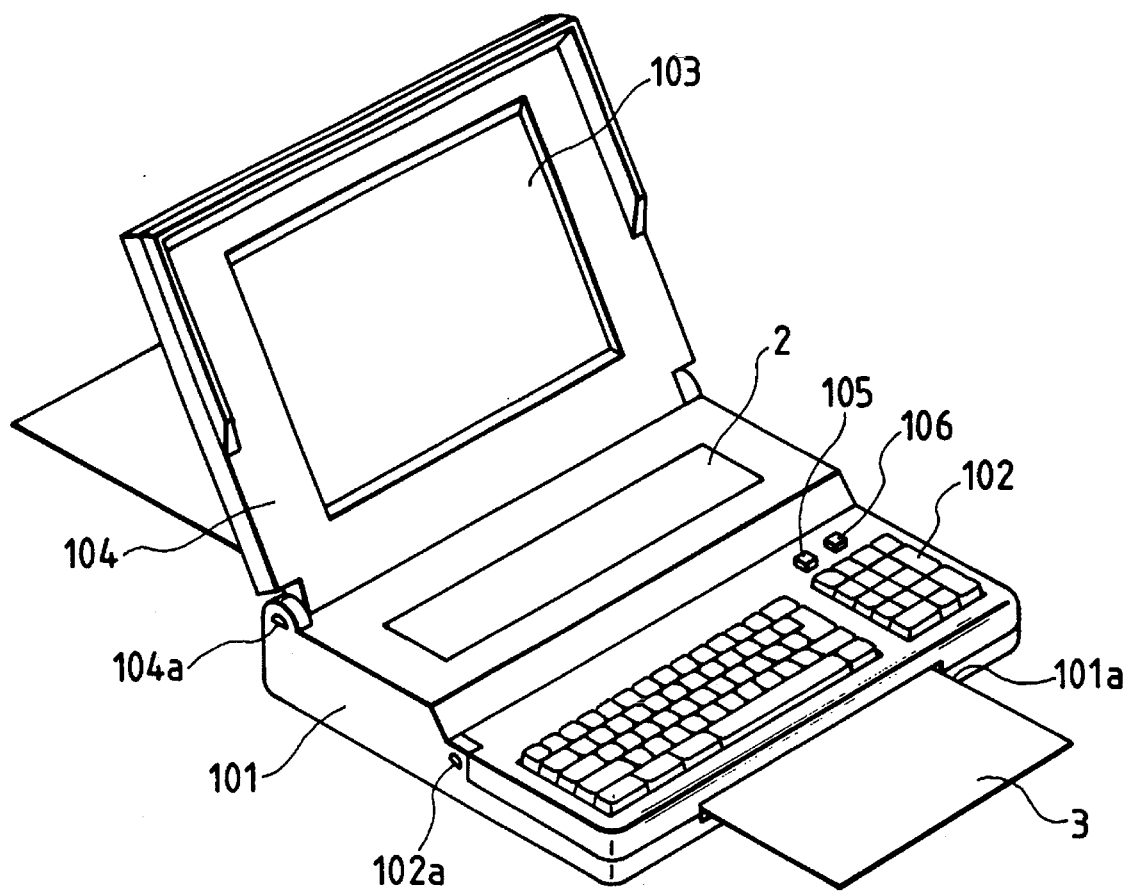
FIG. 1 is a perspective view of a personal computer of the printer integrated type of the invention.

FIG. 1 is a perspective view showing a personal computer of the printer integrated type as an information processing apparatus according to an embodiment of the invention. The information processing apparatus comprises: an apparatus main body 101; a keyboard 102; an upper cover 104 having a display unit 103; a paper feed key 105; a print stop key 106; a printer unit 2; and the like. The upper cover 104 is rotatably attached to the apparatus main body 101 through hinges 104a provided at both ends of the rear edge of the apparatus main body 101. Therefore, when the apparatus is used, the upper cover 104 is opened by its rotation to the position at which a content displayed on the display unit 103 can be easily seen. When the apparatus is not used, the upper cover 104 is closed and can function as a cover. As a display element of the display unit 103, a liquid crystal display element is used because the display unit can be thinly constructed.

The printer unit 2 using a recording head of the ink jet type is arranged in front of the display unit 103 and is enclosed in the apparatus main body 101. The printer unit 2 has an opening portion (not shown) which can be opened or closed by the operator, so that the recording head can be exchanged through the opening portion.

A recording paper 3 is inserted from a paper feed port 101a provided in the lower portion of the keyboard 102 and is conveyed in a conveying path which penetrates in the apparatus main body 101. After that, the recording paper is delivered out of the apparatus from a paper discharge port (not shown) provided at a rear position of the apparatus. The keyboard 102 is rotatably attached through the hinges 104 provided on both sides of the apparatus main body 101. Therefore, even in case of using a relatively short recording paper such as envelope, post card, or the like, the recording paper 3 can be inserted to the deep inner position in the conveying path by opening the keyboard 102 upward. Since the conveying path of the recording paper 3 is provided under the keyboard 102 as mentioned above, even in a state in which the recording paper has been set, various operations can be performed by using the keyboard 102 and display unit 103.

In the embodiment, a portion excluding the printer unit 2, namely, what is called a computer section is called a host computer.

(Schematic Block Diagram of Host-Printer)

Figure 2:
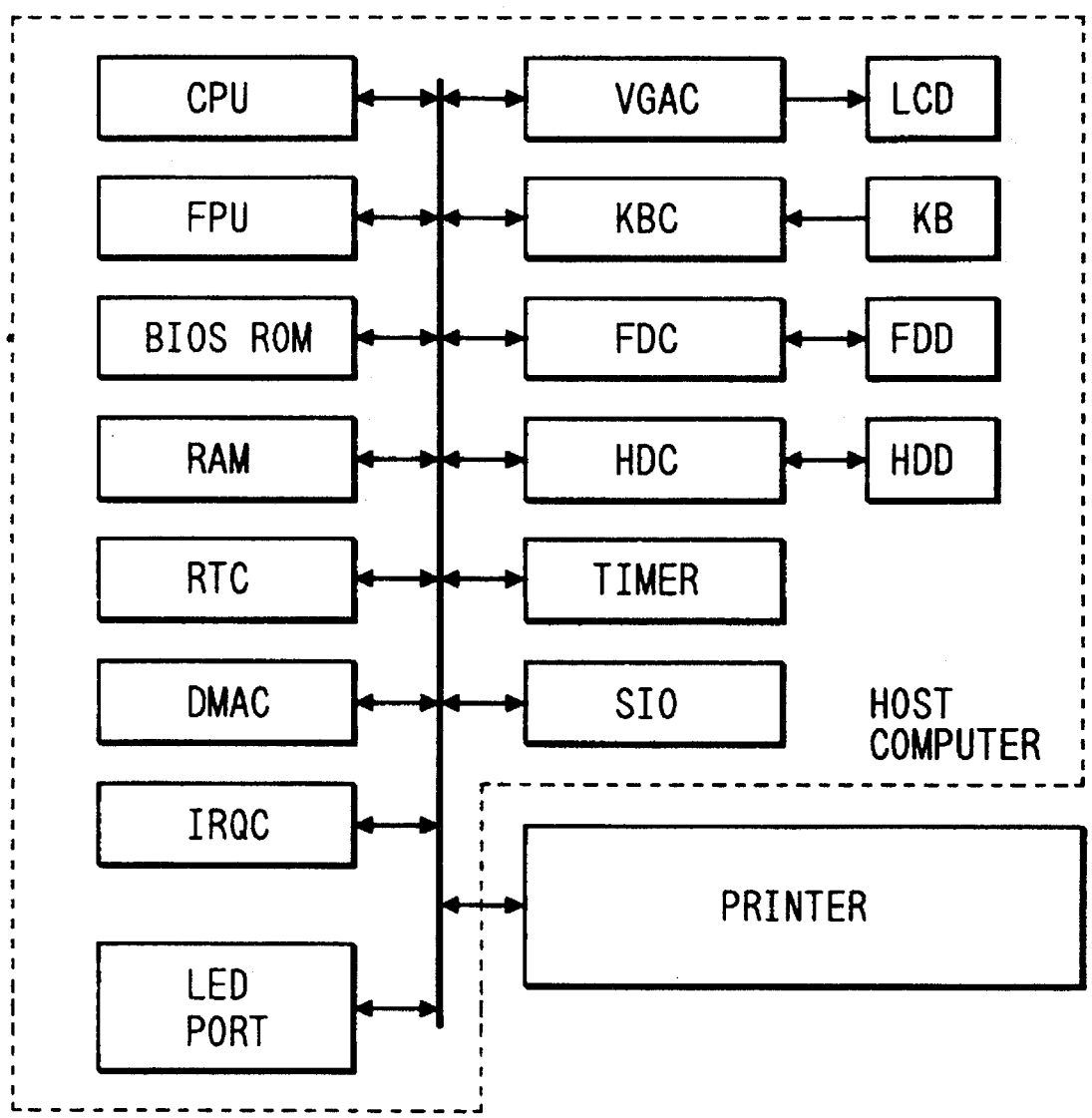
FIG. 2 is a schematic block diagram of a host computer and a printer.

FIG. 2 is a schematic block diagram of a host computer and a printer.

First, in the host computer, a central processing unit (CPU) executes a main control and a BIOS ROM (Basic Input Output system ROM) indicates a fundamental control of the CPU. An application program is read out from a floppy disk (FDD) or a hard disk (HDD) via a floppy disk controller (FDC) or a hard disk controller (HDC). The program is executed by using a system memory (RAM). In this instance, as a displaying method of a screen, characters or the like are displayed on a liquid crystal display (LCD) by using a VGAC (video Graphic Array Controller). A key input from a keyboard (KB) is performed via a keyboard controller (KBC). A numerical value arithmetic operating processor (FPU) supports an arithmetic operating process for the CPU. A real time clock (RTC) indicates the elapsed time at the present time point. Even in a disconnection state of a power supply of the whole system, the RTC executes the operation by a dedicated battery. A DMA controller (DMAC) executes data transfer without using the CPU in order to transfer data at a high speed between memories, between a memory and an I/O, and between an I/O and another I/O. An interruption controller (IRQC) accepts the interruption from each I/O and executes processes in accordance with the priority. A timer (TIMER) has free running timers of a few channels and executes various kinds of time managements. There are also a serial interface (SIO) and an extension port (PORT) which are connected to the outside and an LED to inform an operating state to the user. The printer is connected to the host computer by a general parallel interface and executes the data transmission and reception at a register level of the I/O port. An image of connection of the printer is equivalent to that in the case where data has been transmitted or received to/from an external printer.

Figure 3:
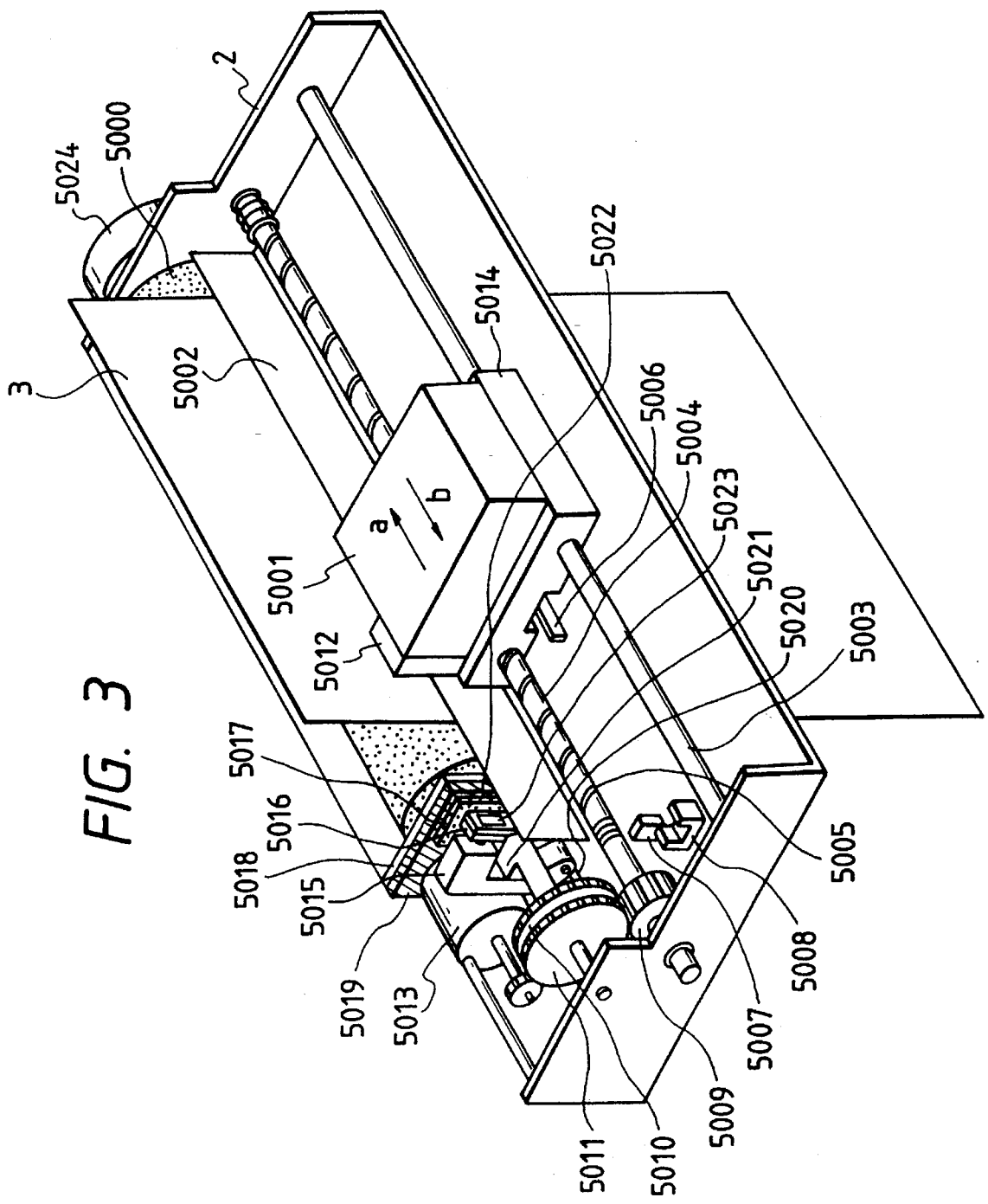
FIG. 3 is a diagram showing an internal construction of a printer unit 2 in FIG. 1.

FIG. 3 is a perspective view for explaining an internal construction of the printer unit 2 using the ink jet recording system to which the invention is embodied or applied. In FIG. 3, reference numeral 5001 indicates an ink tank and 5012 denotes a recording head coupled to the ink tank. An integrated type exchangeable cartridge is formed by both of the ink tank 5001 and the recording head 5012. Reference numeral 5014 denotes a carriage to attach the cartridge to the pritner main body and 5003 denotes a guide to scan the carriage in the sub scanning direction.

Reference numeral 5000 denotes a platen roller to scan the recording paper 3 in the main scanning direction and 5024 indicates a feed motor to rotate the platen roller. In the carriage 5014, a flexible cable (not shown) to supply a driving signal pulse current and a head temperature adjusting current to the recording head 5012 is connected to a printed circuit board (not shown) having an electric circuit to control the printer.

Further, the printer unit 2 with the above construction will now be described in detail. A lead screw 5004 is rotated through driving force transfer gears 5011 and 5009 interlockingly with the forward/ reverse rotation of a driving motor 5013. The carriage 5014 has a pin (not shown) which comes into contact with a spiral groove 5005 of the lead screw 5004. The carriage 5014 is reciprocated in the directions shown by arrows a and b in the diagram. Reference numeral 5002 denotes a paper pressing plate to press the paper to the platen roller 5000 in the moving direction of the carriage. Reference numerals 5007 and 5008 denote photocouplers serving as home position detecting means for confirming the existence of a lever 5006 of the carriage 5014 in each of the regions corresponding to the photocouplers 5007 and 5008 and for performing the switching of the rotating direction of the driving motor 5013 or the like. Reference numeral 5016 denotes a member to support a cap member 5022 to cap the front surface of the recording head. Reference numeral 5015 denotes sucking means for sucking the inside of the cap and performing a sucking recovery of the recording head 5012 through an opening 5023 in the cap.

Reference numeral 5017 denotes a cleaning blade and 5019 indicates a member for enabling the cleaning blade 5017 to be moved in the front/rear direction. A main body supporting plate 5018 is supported by them. The cleaning blade is not limited to the shape shown in the diagram but another well-known cleaning blade can be also obviously used in the invention. Reference numeral 5021 denotes a lever to start the sucking of the sucking recovery. The lever 5021 is moved in association with the movement of a cam 5020 which comes into engagement with the carriage 5014 and a driving force from the driving motor is transferred and controlled by well-known transfer means such as a clutch switching device or the like.

That is, by reversely rotating the driving motor 5013 from the home position of the carriage 5014, the driving force transfer gear 5011 is switched to a driving force transfer gear 5010. The driving force from the driving motor 5013 is transferred to the lever 5021 through the cam 5020, thereby enabling the capping, cleaning, and sucking recovery of the recording head 5012 to be performed.

(Block Diagram of Printer)

Figure 4:
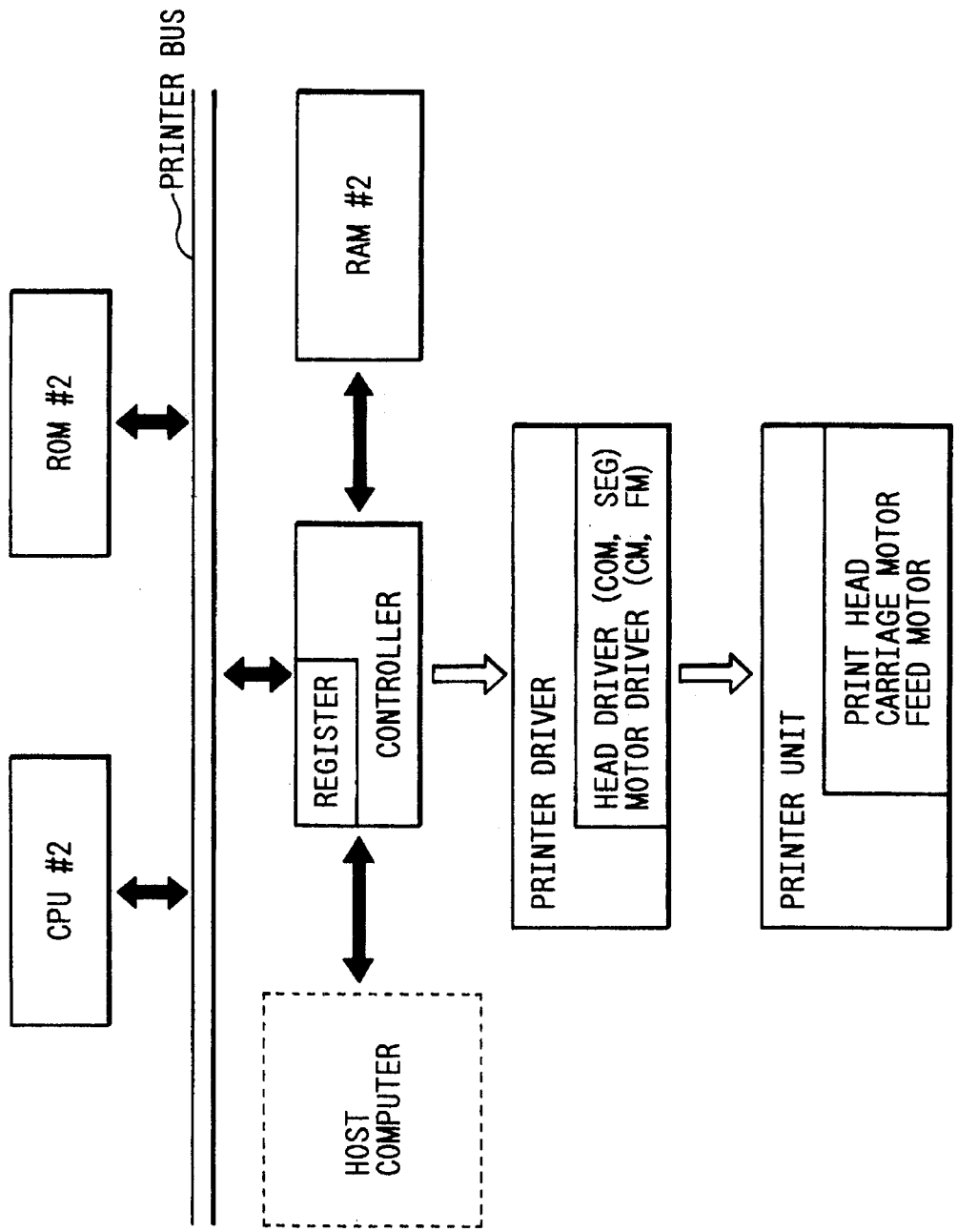
FIG. 4 is a printer block diagram.

FIG. 4 is a block diagram of the printer.

The printer comprises: a CPU #2 to control the printer; a ROM #2 having a printer control program, a printer emulation, and print fonts; a non-volatile RAM #2 to store development data for printing and input data from the host computer; a printer driver to drive a print head of the printer and a motor; and a memory controller to perform an access control of the memory, transmission and reception of data to/from the host computer, and transmission of a control signal to the printer driver.

(Constructional Diagram of Printer Driver)

Figure 5:
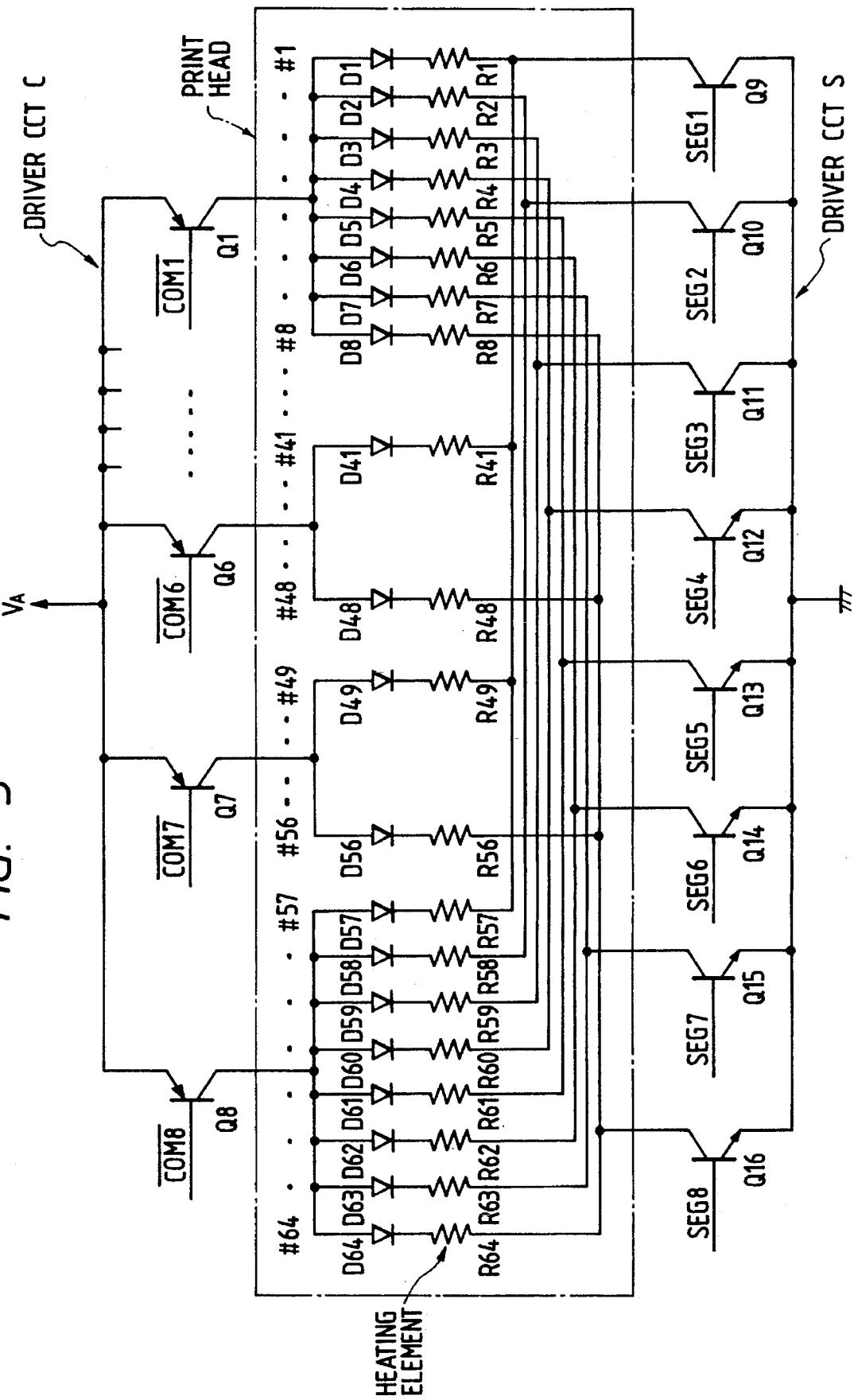
FIG. 5 is a constructional diagram of a recording head and a head driver.

FIG. 5 is a diagram showing a construction of the recording head and head driver.

In the embodiment, it is assumed that an emitting unit has 64 emitting ports. Reference numerals #1 to #64 denote the numbers corresponding to the positions of the emitting ports provided in the emitting unit. $R_1$ to $R_{64}$ denote heating elements serving as emitting energy generating elements which are provided in correspondence to the emitting ports #1 to #64, respectively. The heating elements $R_1$ to $R_{64}$ are divided into eight blocks each consisting of eight heating elements as a unit. Switching transistors $Q_1$ to $Q_8$ of a common side driver circuit C are commonly connected to each block. The transistors $Q_1$ to $Q_8$ turn on/off current paths in accordance with on/off states of control signals $COM_1$ to $COM_8$, respectively. $D_1$ to $D_{64}$ denote diodes for prevention of a back flow which are arranged in the current supplying paths to the heating elements $R_1$ to $R_{64}$.

On/off transistors $Q_9$ to $Q_{16}$ of a segment side driver circuit S are connected to the heating elements locating at the corresponding positions between the blocks. The transistors $Q_1$ to $Q_{16}$ turn on/off the current supplying paths for the heating elements in accordance with the on/off states of control siganls $SEG_1$ to $SEG_8$, respectively.

Figure 6:
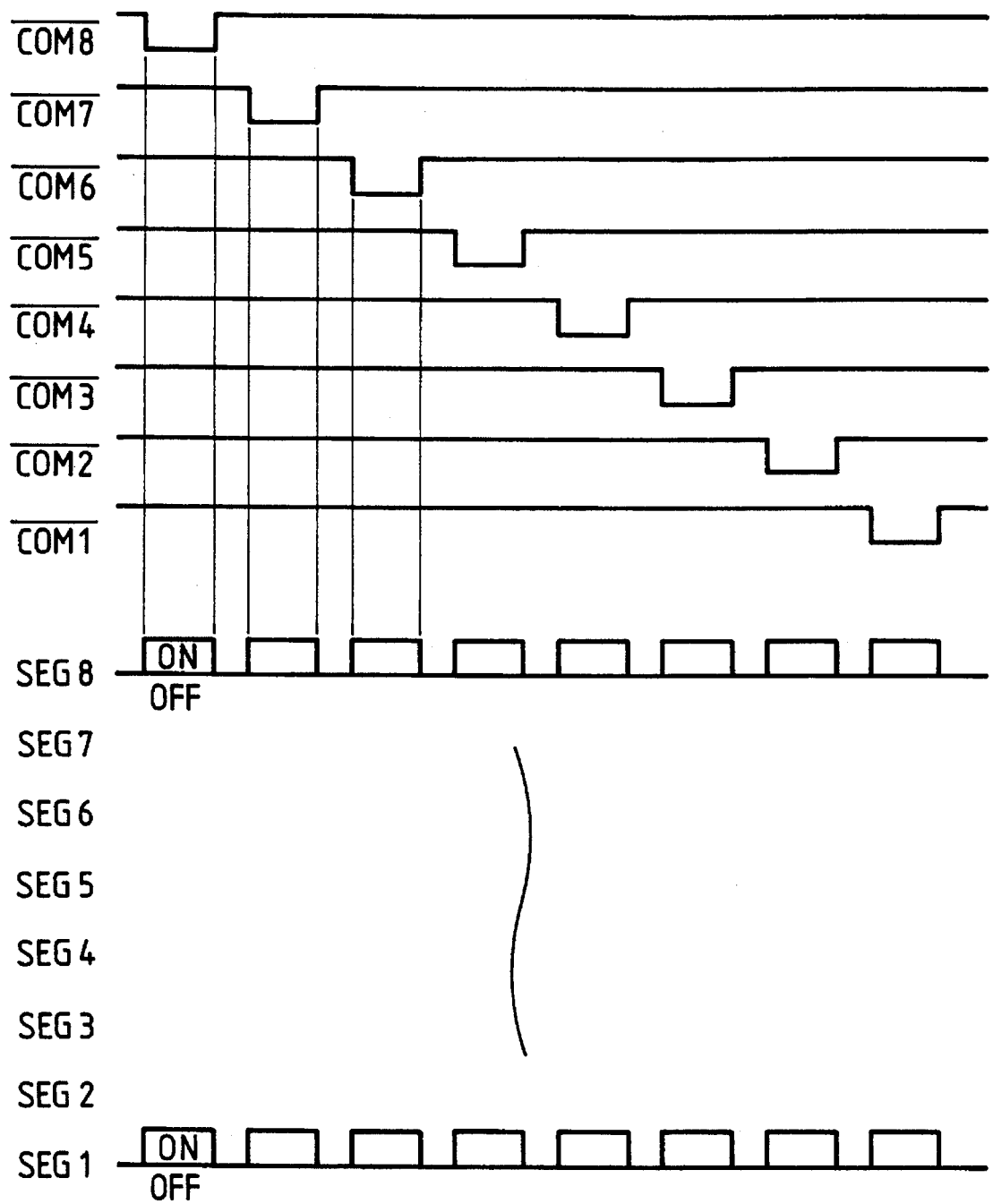
FIG. 6 is a timing chart for driving the head.

FIG. 6 is a diagram showing a timing chart for driving the head according to the above construction. At positions on the head scanning direction, the common side control signals $COM_8$ to $COM_1$ are sequentially turned on. One of the blocks is selected by the turn-on of such signals and is set into a state in which the current can be supplied. Therefore, in the selected block, by turning on or off the segment side control signals $SEG_8$ to $SEG_1$ in accordance with the image based on the recording, the current is selectively supplied to the heating elements and an ink is emitted in accordance with the heat generation, so that a dot is recorded.

Figure 7:
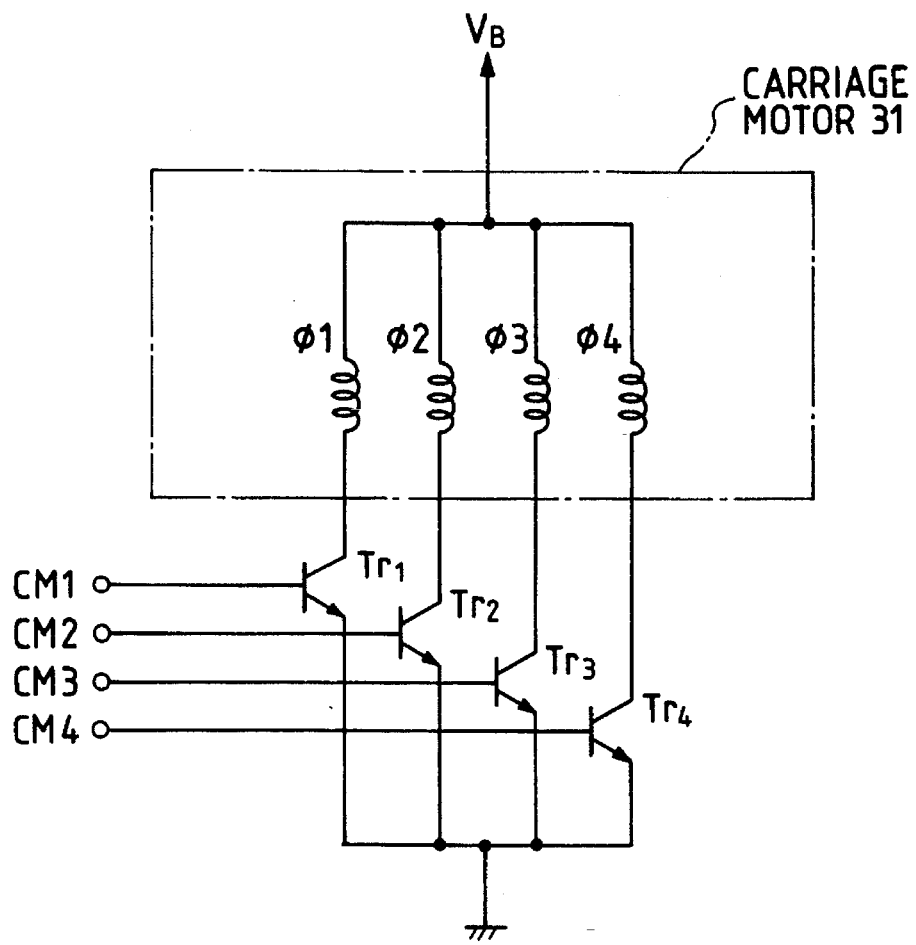
FIG. 7 is a constructional diagram of a carriage motor and a motor driver.

FIG. 7 is a constructional diagram of the carriage motor and motor driver.

Figure 8:
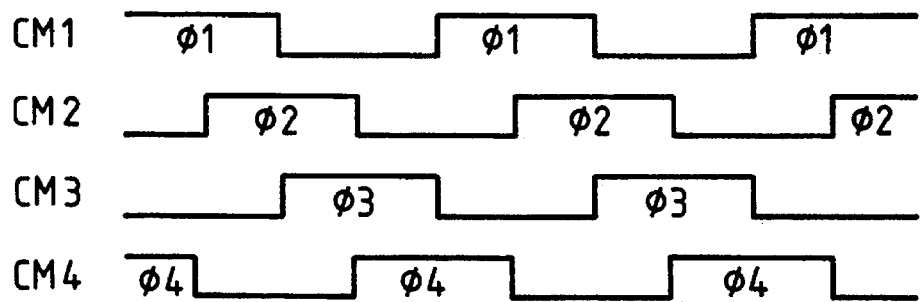
FIG. 8 is a timing chart for driving the driver in FIG. 7.

FIG. 8 is a diagram showing driving timings of them.

Explanation will now be made with reference to FIGS. 7 and 8. In the invention, a stepping motor having coils $\phi_1$ to $\phi_4$ is used as a carriage motor. Switching transistors $TR_1$ to $TR_4$ connected to those coils are properly turned on/off by driving signals $CM_1$ to $CM_4$, thereby driving the carriage motor by a 4-phase exciting method as shown in FIG. 8.

The feed motor is also driven by driving signals $FM_1$ to $FM_4$ by a construction similar to that mentioned above.

(Construction of Printer Controller)

Figure 9:
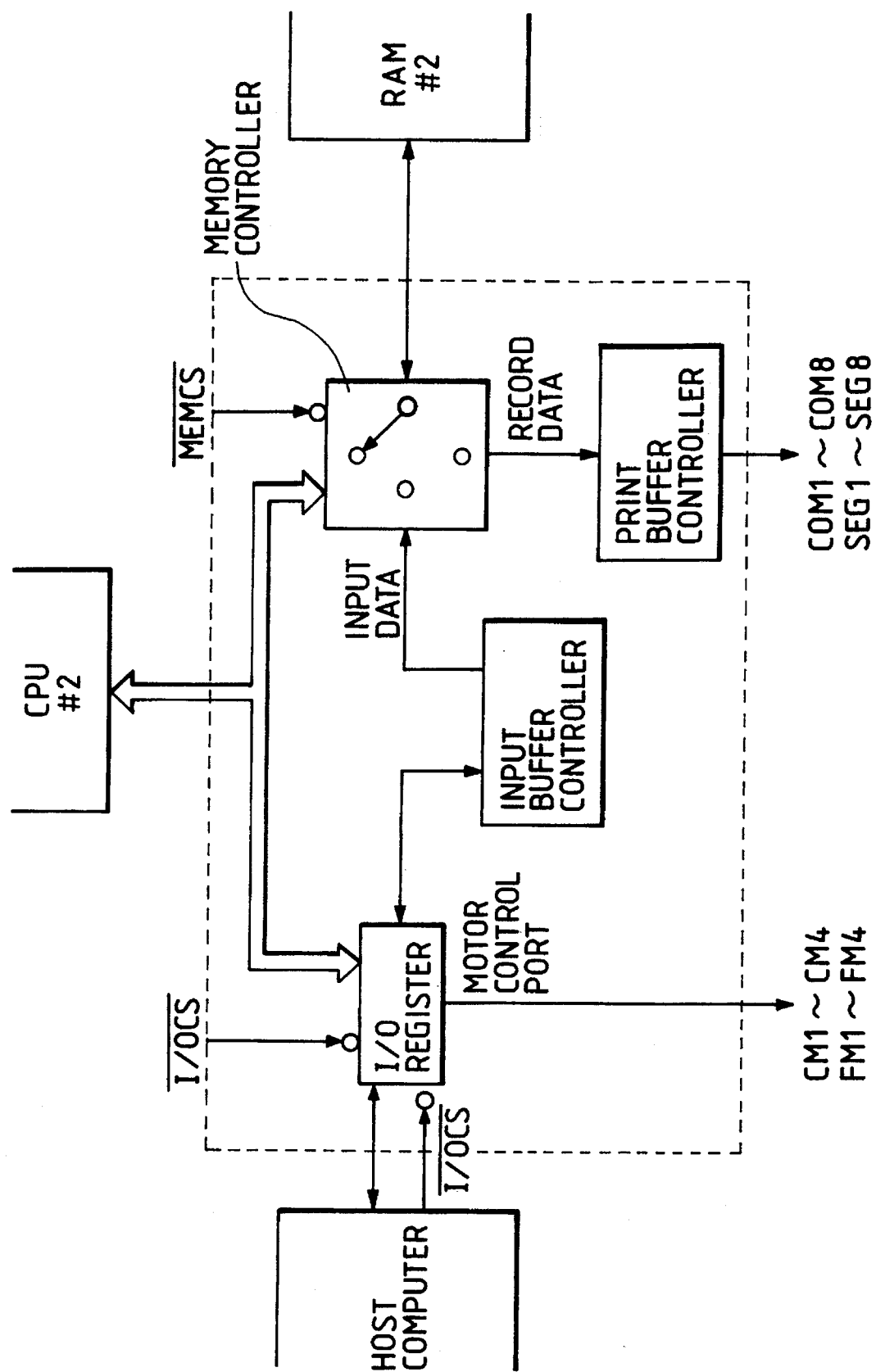
FIG. 9 is a constructional diagram of a printer controller.

FIG. 9 is a constructional diagram of a printer controller.

A functional block of the controller is constructed by the following four blocks: an I/O data register to transmit and receive data to/from the host computer at the command level; an input buffer controller to directly write the input data from the I/O data register into the RAM #2; a print buffer controller for reading out the recording data from an input data buffer in the RAM #2 and sending the control signals ($COM_1$ to $COM_8$)/($SEG_1$ to $SEG_8$) to the head driver; and a memory controller to control the memory accesses to the RAM #2 from three directions (namely, CPU #2, input buffer controller, print buffer controller).

Figure 10:
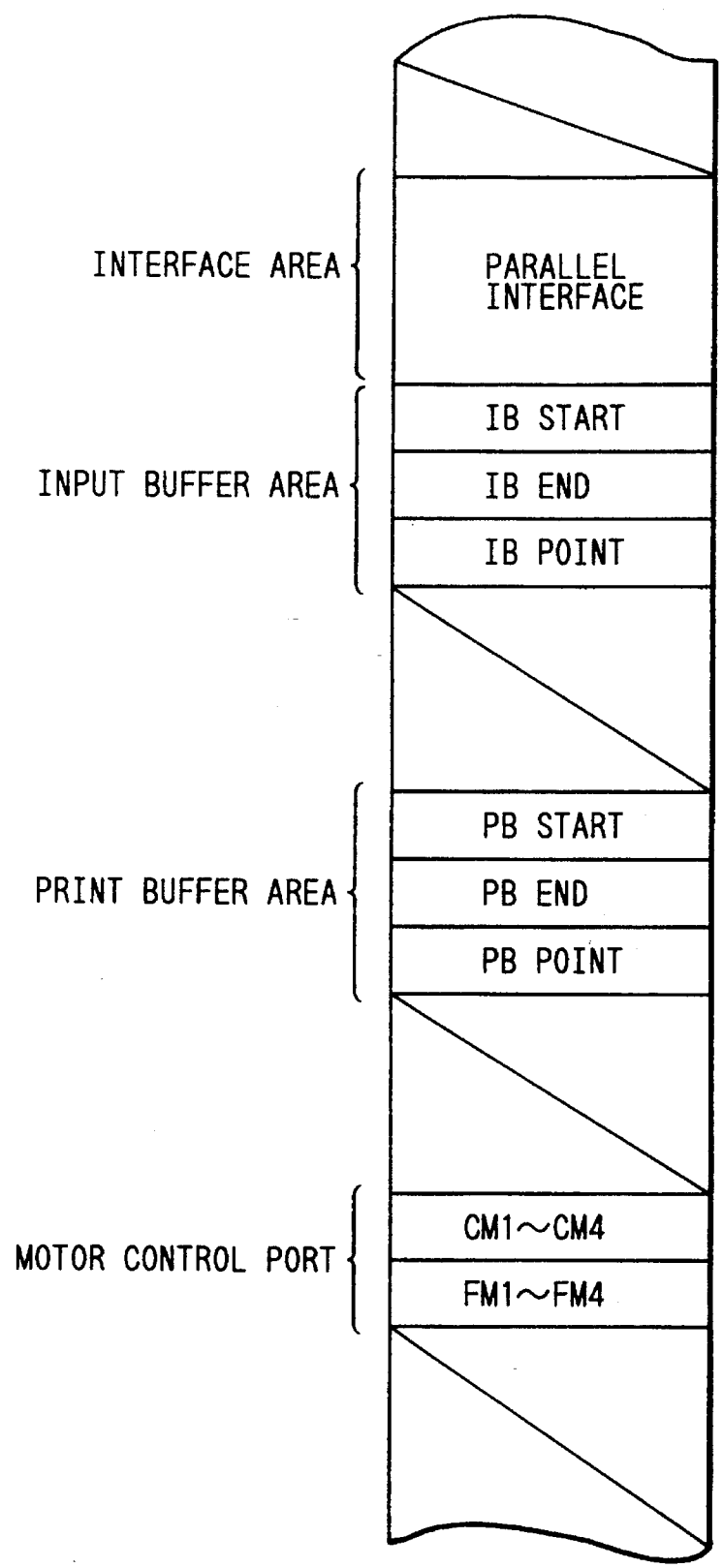
FIG. 10 is a diagram showing a map in a printer I/O register.

FIG. 10 is a diagram showing a map in the I/O data register (shown in FIG. 9) of the printer.

In FIG. 10, a motor control port directly rewrites the values of the register, thereby controlling the port and driving each motor ($CM_1$ to $CM_4$; $FM_1$ to $FM_4$).

A print buffer area is used to set a data area which is necessary for printing. By setting a start address (PB START) and an end address (PB END), the print data is sequentially read out from the start address by the print buffer controller in a range specified by the start address and end address. The print data is read out from the RAM #2 until the end address and the control signals are sent to the head driver. In this instance, a print data address pointer (PB POINT) indicates the data address in which the data is at present being transmitted.

An input data buffer area is also similarly used to set a data area necessary for reception. By setting a start address (IB START) and an end address (IB END), the input data is sequentially written from the start address by the input buffer controller in a range specified by the start address and end address. The input data is written into the RAM #2 until the end address. In this instance, an input data address pointer (IB POINT) indicates the data address in which the data has already been received at present.

Figure 11:
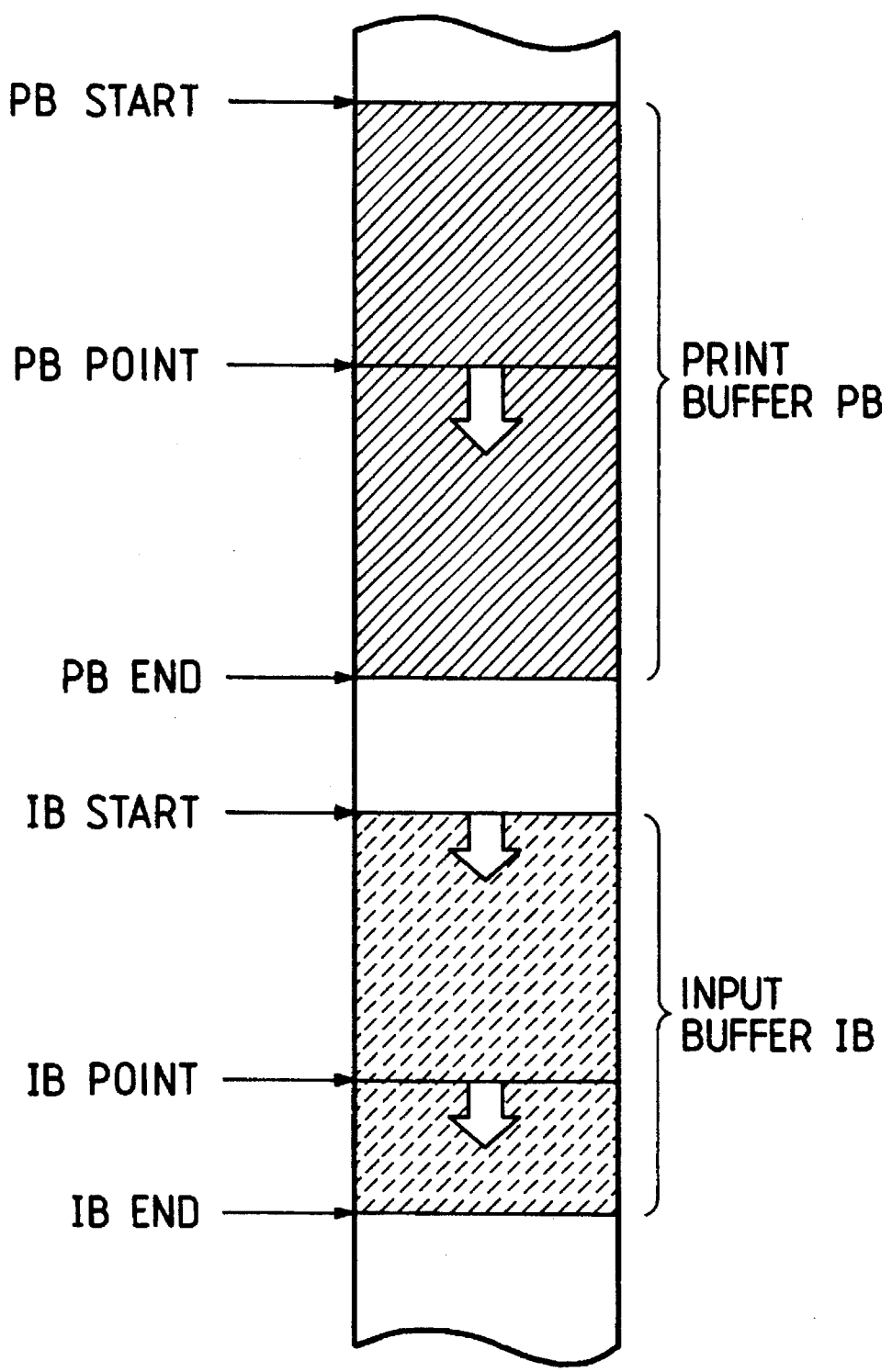
FIG. 11 is a diagram showing address areas in a recording data buffer and an input buffer.

FIG. 11 shows address areas of a print buffer (PB) and an input buffer (IB) in the RAM #2 in the above operations, respectively. As shown in FIG. 10, each address is indicated in the printer I/O register. An interface area is an I/O area which is commonly used for the host computer and the printer. A portion of the interface area is an area to transmit or receive data to/from the host computer. Such a portion corresponds to a port of a parallel interface in the host computer.

Figure 12:
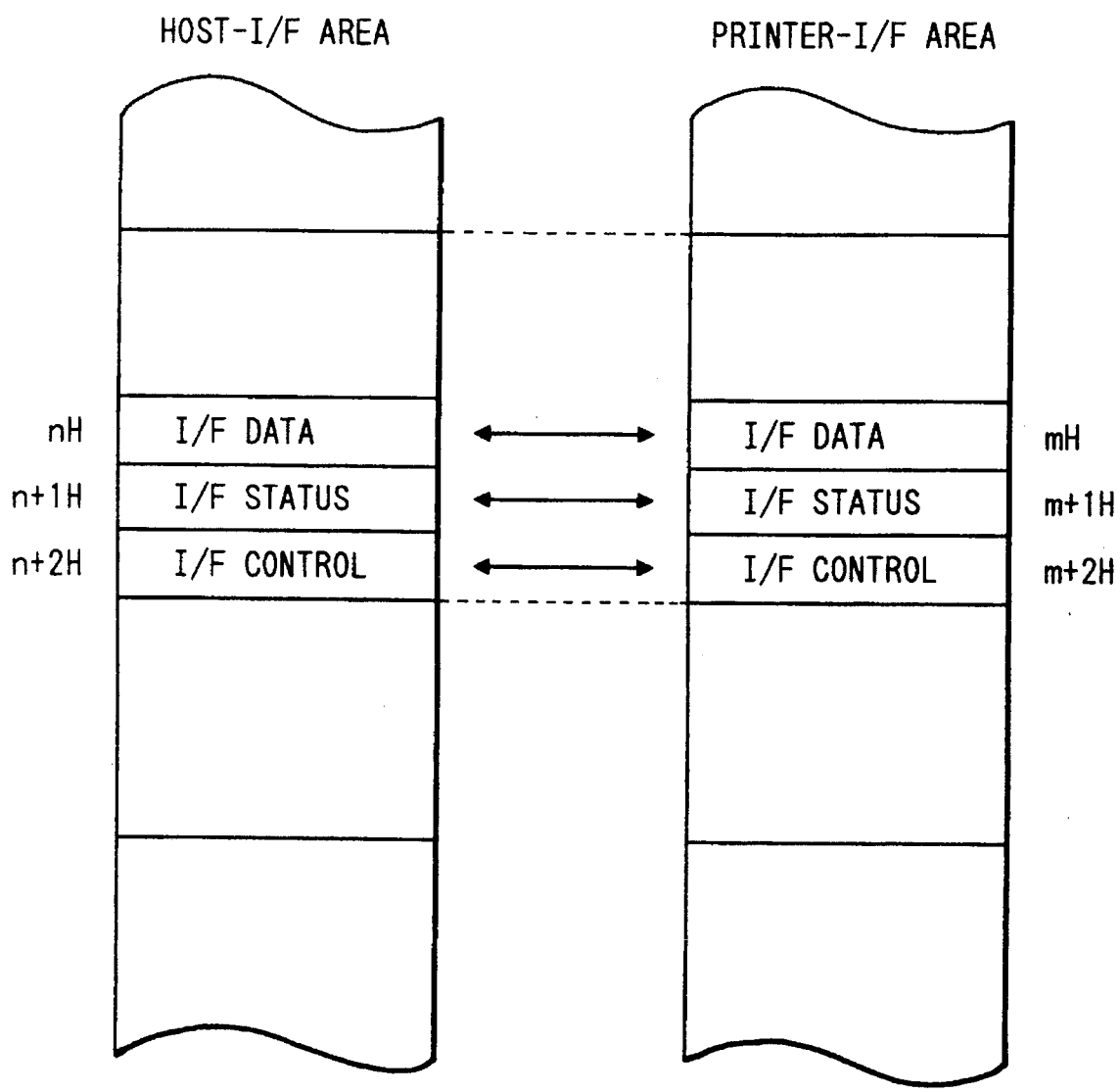
FIG. 12 is a diagram showing the correlation in I/O areas of the host computer and the printer.

The interface area will now be described with reference to a diagram showing the correlation between the interface areas of the host computer and the printer in FIG. 12.

An address map is set so that the addresses (n, n+1, n+2) when they are seen from the host computer side correspond to the addresses (m, m+1, m+2) when they are seen from the printer side in a manner such that the register of the I/F data, I/F status, and I/F control on the host computer side indicates the same addresses as those of the register of the I/F data, I/F status, and I/F control on the printer side.

That is, those registers are constructed so that the data in the addresses in such a portion can be read out and written in bidirections.

An I/O register to control peripheral equipment is also provided on the host computer side and is used for I/O control in the host computer. That is, the I/O register has the I/O areas of the blocks shown in FIG. 2. Only the control area of the interface among them is common to the interface area of the I/O register on the printer side. FIG. 12 shows the above relation.

Processes after the power supply on the host computer side was turned on will now be described hereinbelow.

Figure 13:
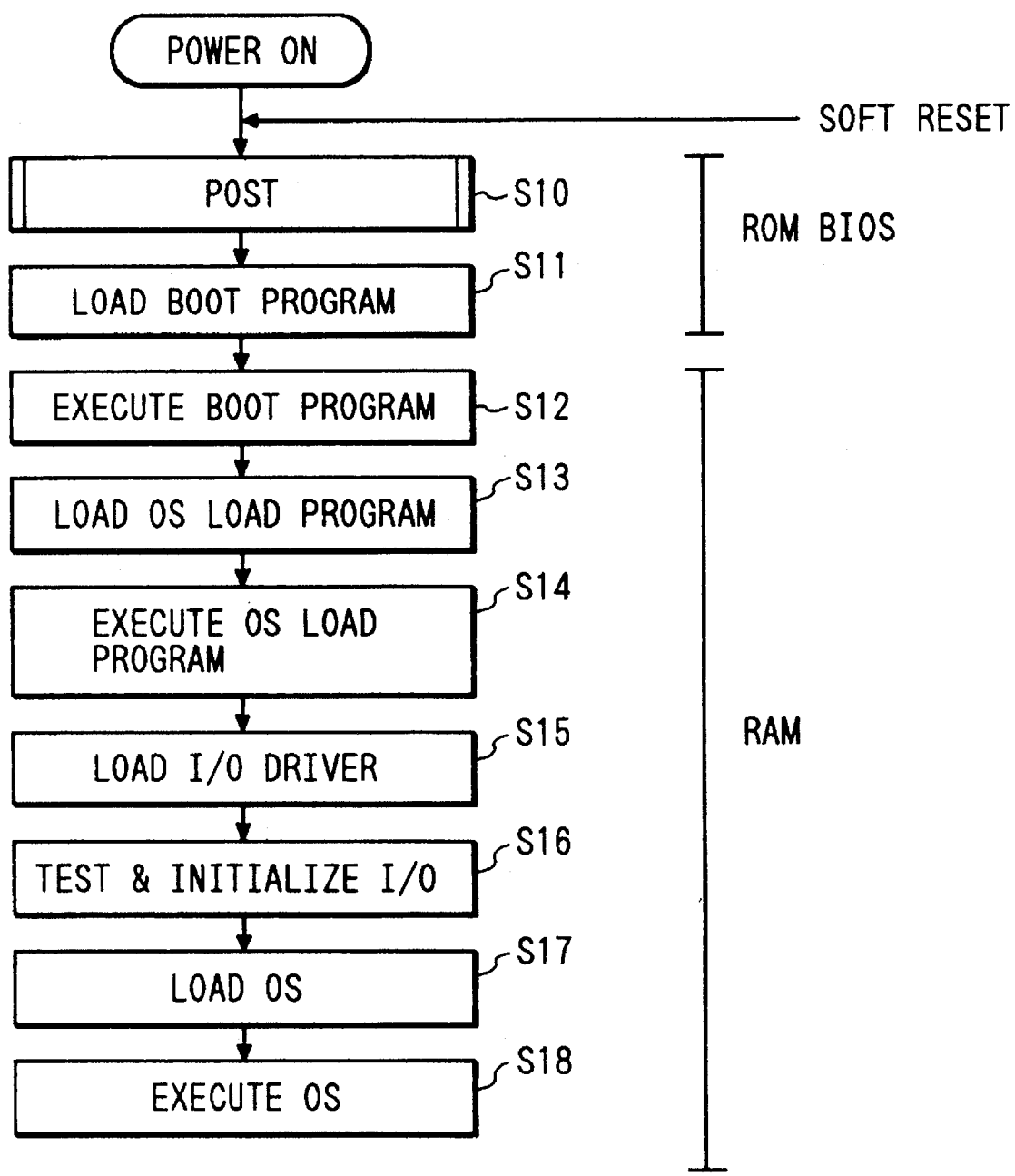

FIG. 13 is a flowchart when the power supply is turned on. First, the processing routine advances to step S10. A soft resetting process by the keyboard also advances to step S10 in a manner similar to the case of the turn-on of the power supply. In step S10, a POST process is executed. The POST process relates to a power-on self-test and a test and an initialization of each hardware are executed. In the next step S11, a boot program is loaded in order to activate a system program. The boot program is preserved into an FD (floppy disk), HD (hard disk), or the like and is arranged, for instance, in a track 0 and a sector 1. By storing the track 0 and sector 1 into the memory, the boot program is loaded. Processes in steps S10 and S11 exist in an ROM BIOS. In the next step S12, the loaded boot program is executed. The boot program is a program to load a program for loading an OS program from the FD or HD. In step S13, an OS load program is loaded. In step S14, the OS load program is executed. The OS load program is a program to load the OS into the memory. In step S15, an I/O driver is first loaded. The I/O driver relates to a program to control the I/O. The OS executes the transmission and reception of data with various kinds of I/O by the I/O driver. In step S16, the I/O is tested and initialized. In step S17, the OS is loaded into the memory. The preparation to execute the OS is completed by the above steps. The processing routine advances to step S18 and the OS is executed. The OS processes the input from the keyboard and displays various kinds of messages to the display and performs the transmission and reception of data with the operator. The OS executes various kinds of command processes in accordance with the inputs of various kinds of commands of the operator.

Figure 14:
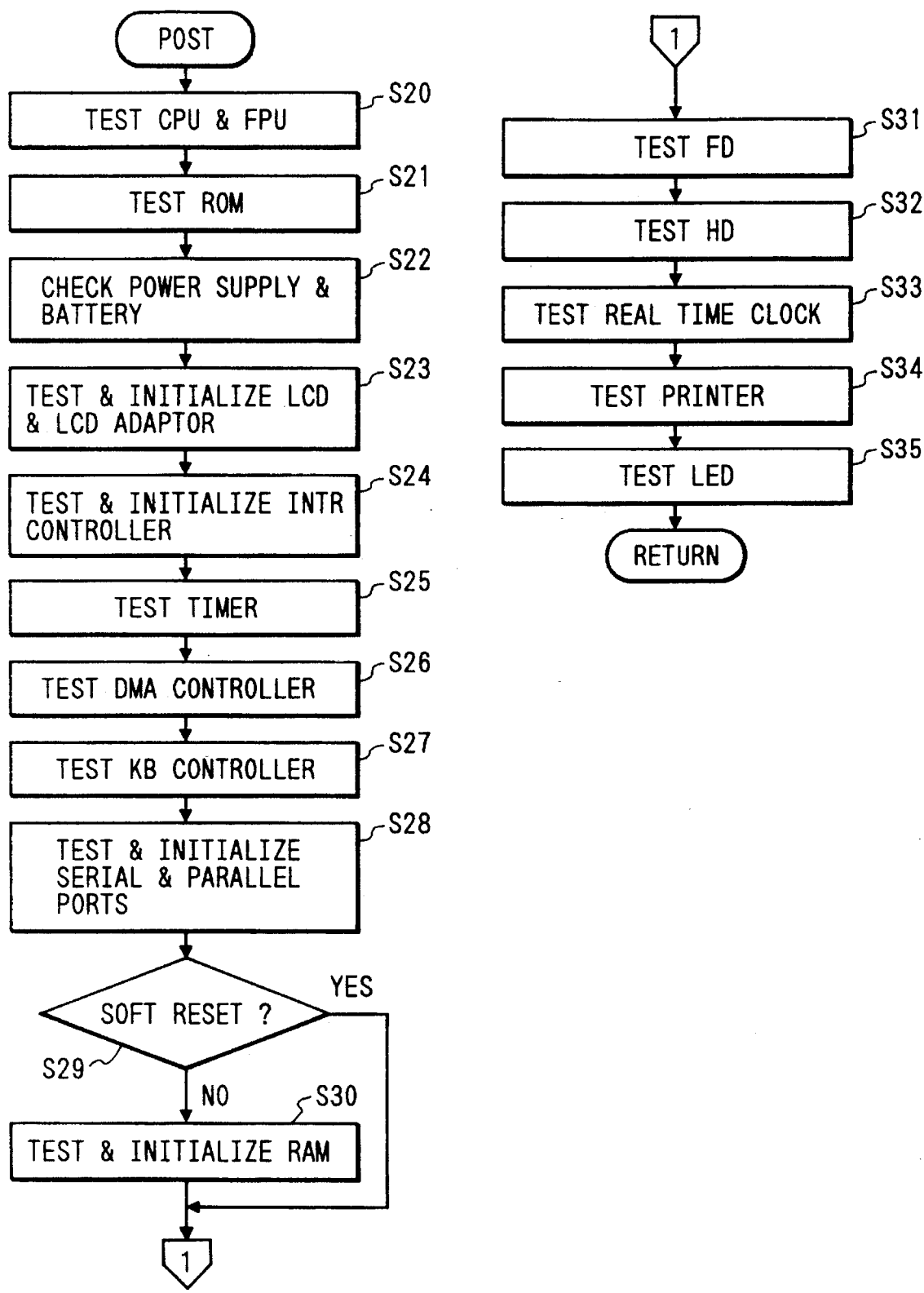
FIG. 14 is a flowchart for POST.

FIG. 14 is a flowchart for explaining the POST in step S10 in FIG. 13 in detail. Explanation will now be made hereinbelow in accordance with the flow of FIG. 14. A test of the CPU (FPU (numerical value arithmetic operating processor, coprocessor) in FIG. 2) is executed (in step S20). A test of the ROM is first subsequently performed (S21). The power supply and a battery are checked (S22). Tests and initialization of the LCD and LCD adapter are executed. The LCD adapter includes a RAM and a ROM and they are also checked (S23). Subsequently, a test and intialization of the interruption controller are executed (S24). A test of the timer is performed (S25). A test of the DMA controller is executed (S26). Tests of the keyboard and the keyboard controller are executed (S27). A test and initialization of the serial parallel port are executed (S28). A check is subsequently made to see if a soft reset is executed or not (S29). If YES, processes for testing and initializing the RAM in step S30 are skipped and step S31 follows. If NO in step S29, step S30 follows and a test and initialization of the RAM are executed. A test of the FD (floppy disk) is now performed (S31). A test of the HD (hard disk) is performed (S32). A test of the real time clock is performed (S33). A test of the printer is performed (S34). When the printer is tested, various kinds of printer ports are checked and the connection of the printer is checked. A test of the LED is now performed (S35). The processing routine is returned. By the above processes, the POST process shown in step S10 in FIG. 13 is executed. When an error or the like occurs in each apparatus, it is informed.

A keyboard interrupting process and a key code obtaining process will now be described. The keyboard interrupting process is executed by the interruption controller in response to the interruption generated from the keyboard controller in accordance with the depression of an interruption key of the keyboard and the keyboard interrupting process is executed. In the key code obtaining process, the key code stored is extracted from the key buffer by the keyboard interruption and the key code is returned to the necessary process. Although not shown, the key buffer is provided in a BIOS common area in the RAM in FIG. 2. The keyboard interrupting process is allocated to a hardware interruption entry or the like in an interruption map (not shown) of each I/O. The key code obtaining process is allocated to a software interruption entry or the like. Each of those processes is interrupted by the keyboard and is executed by accessing the software interruption.

Figure 15:
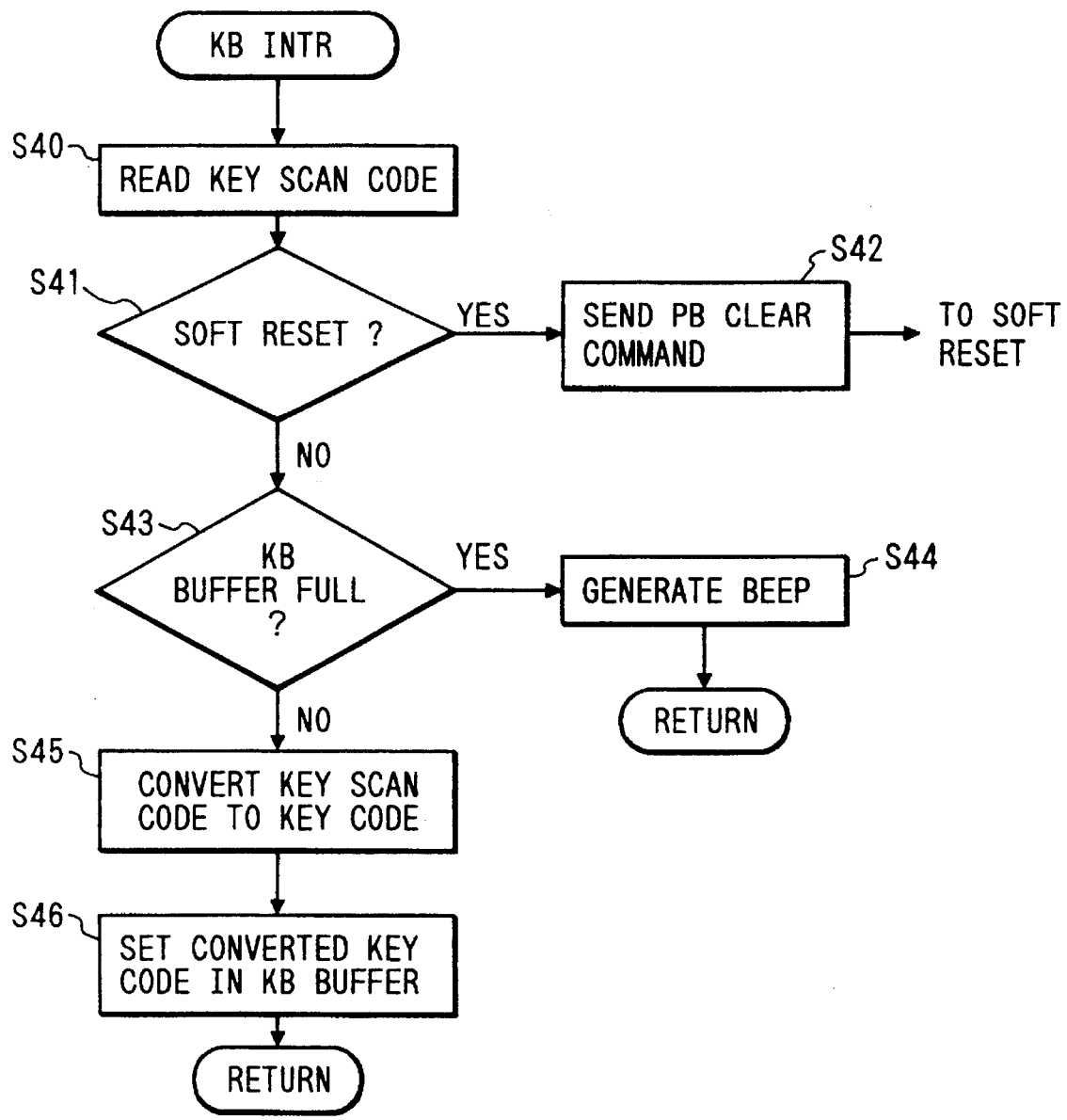
FIG. 15 is a flowchart for a keyboard interrupting process.

FIG. 15 is a diagram showing a flowchart regarding the processes in the case where the keyboard interruption occurs. In the diagram, when the keyboard interruption first occurs, a key scan code is read out from the port allocated to the keyboard of the I/O in step S40. In step S41, a check is made to see if the read-out code is a code corresponding to the soft reset or not. If YES, a print buffer clear command is transmitted in step S42. After the print buffer clear command was transmitted, the actual soft resetting operation is started. When the read-out code does not indicate the soft reset, a check is made in step S43 to see if the keyboard buffer is full or not. If YES, a beep sound for alarming is generated in step S44 and the processing routine is finished. If NO, the key scan code is converted into the key code corresponding to the character code in step S45. Further, the converted key code is set into the key buffer in step S46 and the processing routine is finished.

As described above, when the soft reset is executed in the keyboard interrupting process, a buffer clear command is transmitted to the printer, thereby executing a buffer clearing process of the printer.

Figure 16:
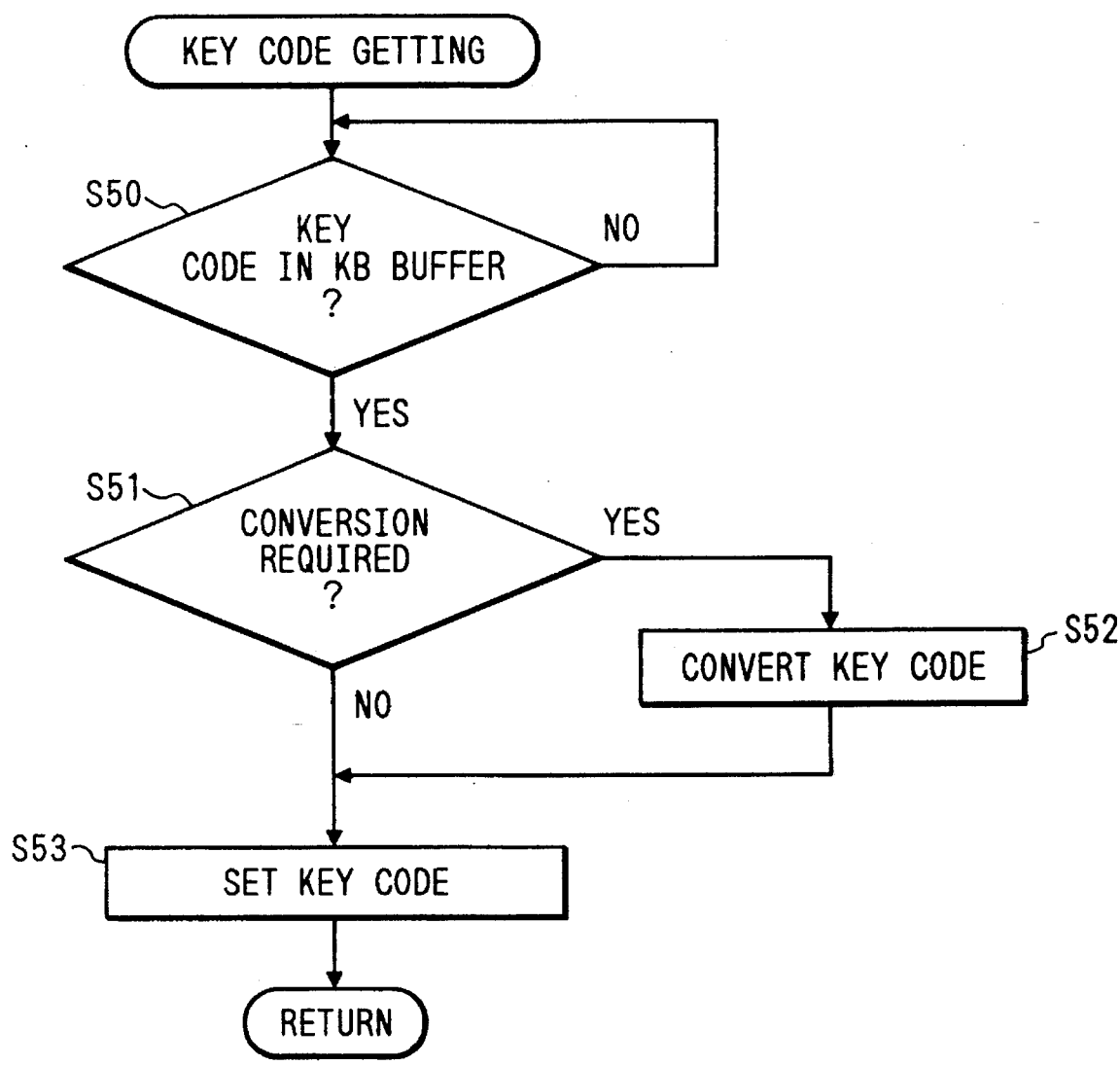
FIG. 16 is a flowchart for a key code obtaining process.

FIG. 16 is a diagram showing a flowchart regarding the key code obtaining process.

In the diagram, when the key code obtaining operation is started, a check is first made in step S50 to see if there is a key code in the keyboard buffer or not. If NO, a process in step S50 is repeated and the apparatus waits until the key code is loaded into the key code buffer. When the key code exists in the key code buffer, a check is made in step S51 to see if the conversion of the key code is necessary or not. If YES, the key code is converted in step S52 (the conversion of the key code mainly occurs in the case where the keyboard differs depending on the country, or the like).

When there is no need to convert the key code, or after the key code was converted in step S52 because of the necessity of the conversion of the key code, the key code is set into a register for repeating the key code in step S53 and the processing routine is finished.

Figure 17:
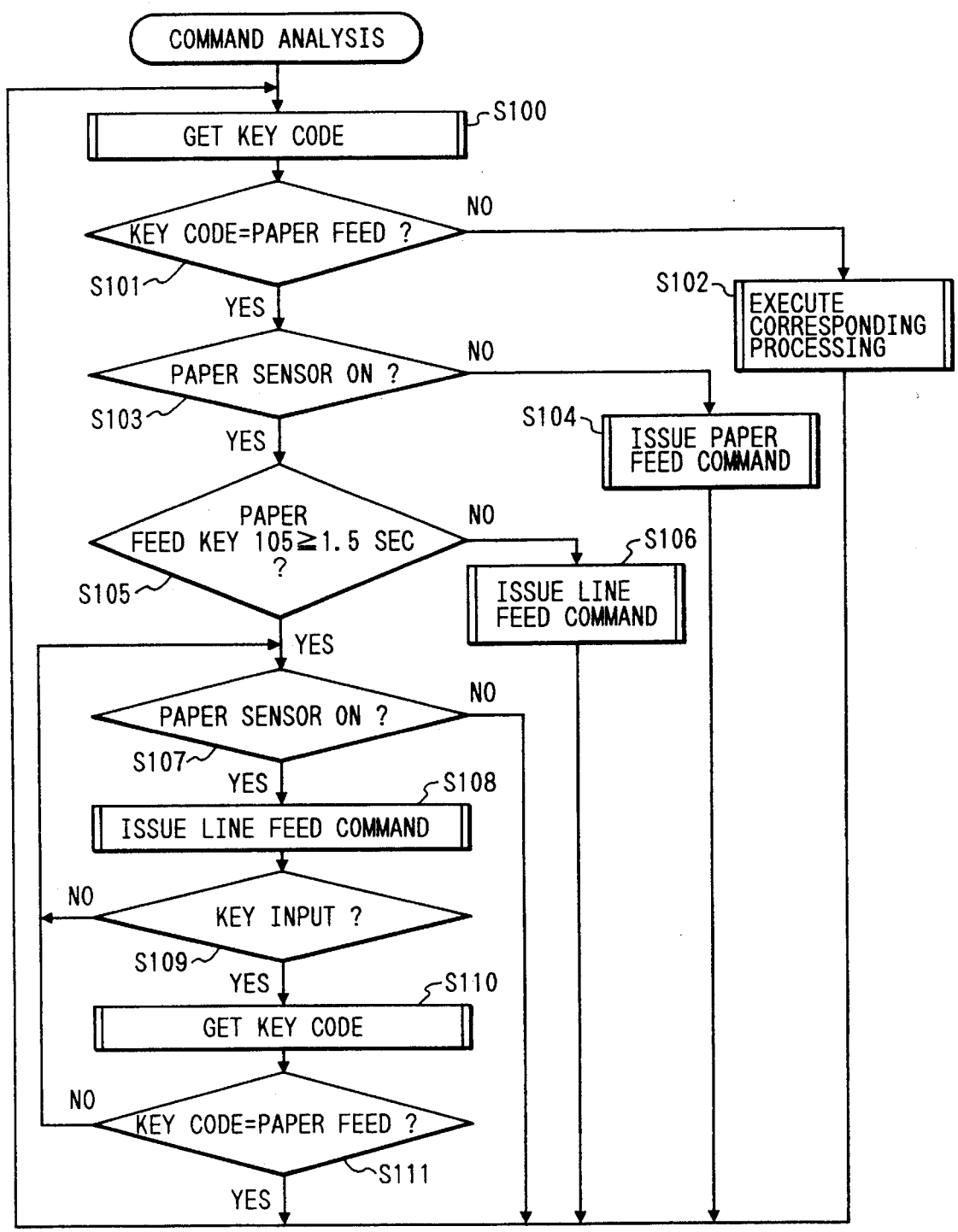
FIG. 17 is a flowchart for a command analyzing process.

FIG. 17 is a diagram showing a host side command analysis processing flow for a key.

First, the CPU executes the key code obtaining process in step S100. In the next step S101, a check is made to see if the key code of the input key coincides with the key code of a paper feed key or not. If NO in step S101, the process corresponding to such a key code is executed in step S102 and the processing routine is returned to step S100. If YES in step S101, the processing routine advances to step S103. A check is made in step S103 to see if the paper sensor is turned on or not. If NO in step S103, a paper feed command is issued to the printer in step S104 and the processing routine is returned to step S100. If YES in step S103, step S105 follows. A check is made in step S105 to see if the paper feed key 105 has continuously been pressed for 1.5 seconds or more or not. If NO in step S105, a line feed command is issued to the printer in step S106 and the processing routine is returned to step S100. If YES in step S105, a check is again made in step S107 to see if the paper sensor is turned on or not. If NO in step S107, the processing routine is returned to step S100. If YES in step S107, the line feed command is issued to the printer in step S108. A check is subsequently made in step S109 to see if there is a key input or not. If NO in step S109, the processing routine is returned to step S107. If YES in step S109, the key code is obtained in step S110. In the next step S111, a check is made to see if the key code obtained in step S110 coincides with the key code of the paper feed key or not. If NO in step S111, the processing routine is returned to step S107. If YES in step S111, the processing routine is returned to step S100.

Processes on the printer side will now be described.

Figure 18:
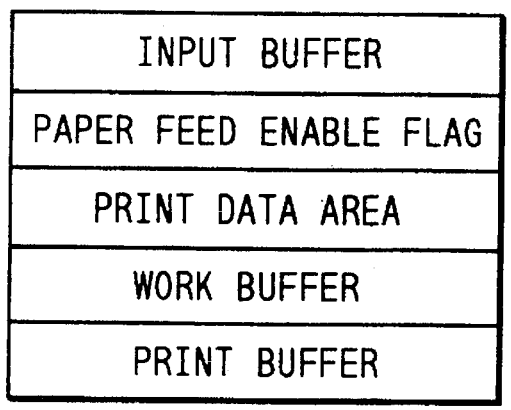
FIG. 18 is a diagram showing a construction of an RAM #2.

FIG. 18 is a diagram showing in detail read/write memories including the buffers, flag, and the like in the RAM #2 shown in FIG. 4. In the diagram, the input buffer is a buffer to receive the print command and print data transferred from the main body to the printer. The data supplied to the input port of the printer is stored in the input buffer. A paper feed enable flag (PFEF) corresponds to a memory to judge whether the paper feed can be executed or not. A print data area is a data area including a flag and a register which are necessary to print. The printing is executed by using the values held in the data area, for example, by using margin information or the like. A work buffer is a work area which is temporarily used. The work area is used for works such as processing, change, or the like of data. A print buffer corresponds to an area to hold data to print. Print image data is accumulated into the print buffer. The data held in the print buffer is transferred to the print unit and the printing is executed.

Figure 19:
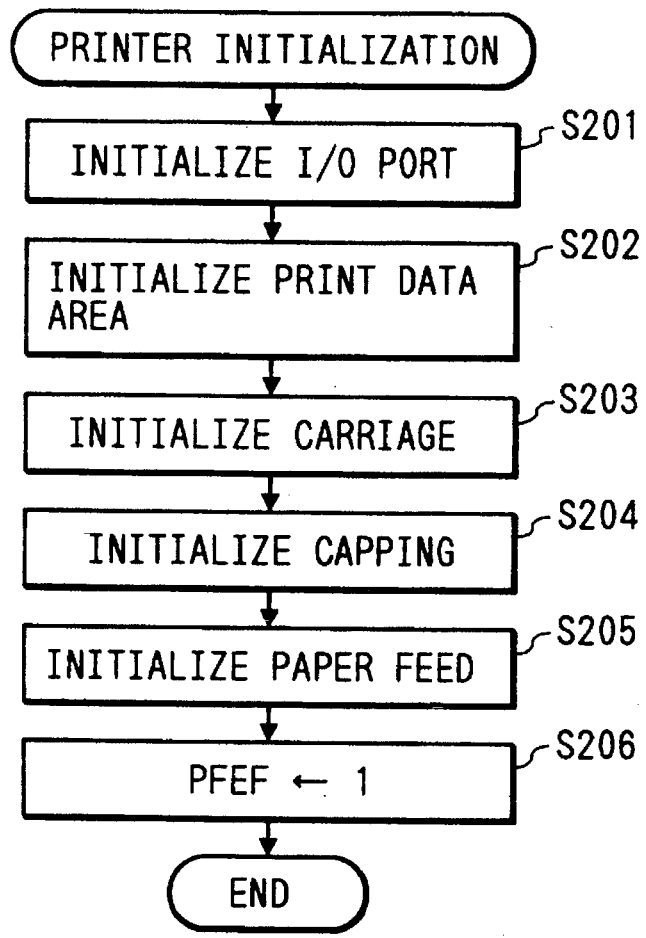
FIG. 19 is a flowchart for a printer initializing process.

FIG. 19 is a diagram showing a flow of a printer initializing process.

First, in step S201, a printer driving system I/O port is initialized. In step S202, the print data area shown in FIG. 18 is initialized. Further, a driving system (carriage, capping, and paper feed) is initialized in steps S203, S204, and S205. Lastly, the paper feed enable flag (PFEF) is lastly set in step S206 and the initializing processing routine is finished.

Figure 20:
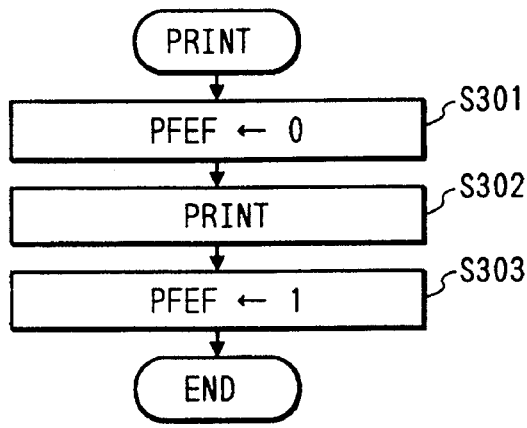
FIG. 20 is a flowchart for a printing process.

FIG. 20 is a diagram showing a flow for a printing process.

In step S301, the CPU #2 first resets the paper feed enable flag (PFEF). In the next step S302, the input data from the host computer is printed by emitting inks by using 64 nozzles (orifices, opening portions). The description of the printing operation are now omitted here. After all of the input data was printed, the paper feed enable flag (PFEF) is again set in step S303.

Figure 21:
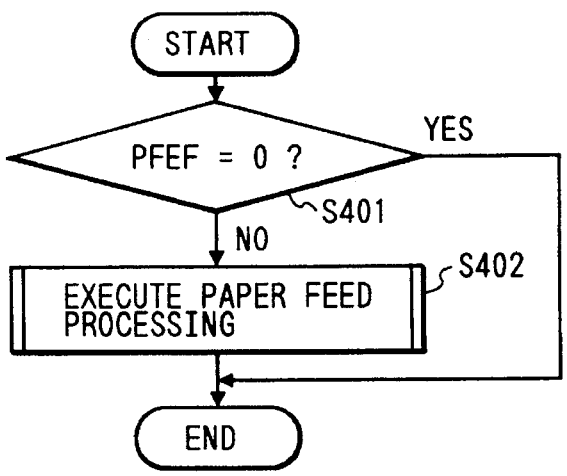
FIG. 21 is a flowchart for a printer side process for a paper feed command.

FIG. 21 is a diagram showing a flow for processes on the printer side for a paper feed command.

In the first step S401, the CPU #2 discriminates whether a paper feed enable command is set to "0" or not. If YES in step S401, the processing routine is finished. If NO in step S401, a paper feeding process is executed in step S402.

Figure 22:
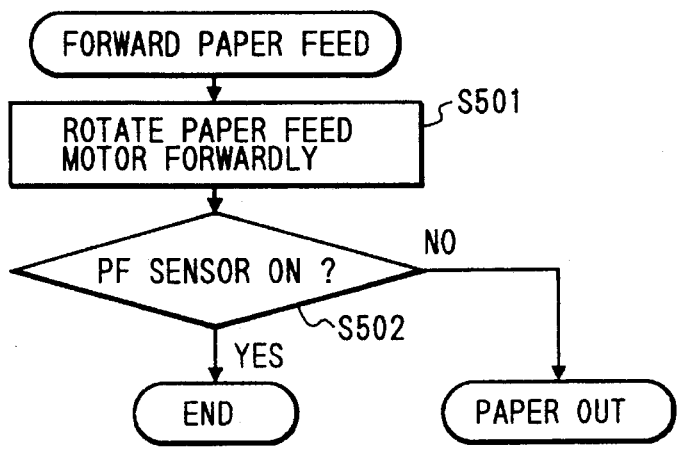
FIG. 22 is a flowchart for a paper feeding process.

FIG. 22 is a diagram showing a flow for a paper feeding process.

In step S501, a paper feed motor is rotated in the forward direction by an amount corresponding to 728 pulses. In step S502, the CPU #2 discriminates whether the paper has reached a paper sensor (PE) or not. If YES in step S502, the paper feed is completed. If NO in step S502, a buzzer sound or the like is generated to indicate a paper out error. However, a description in this case is omitted here.

Figure 23:
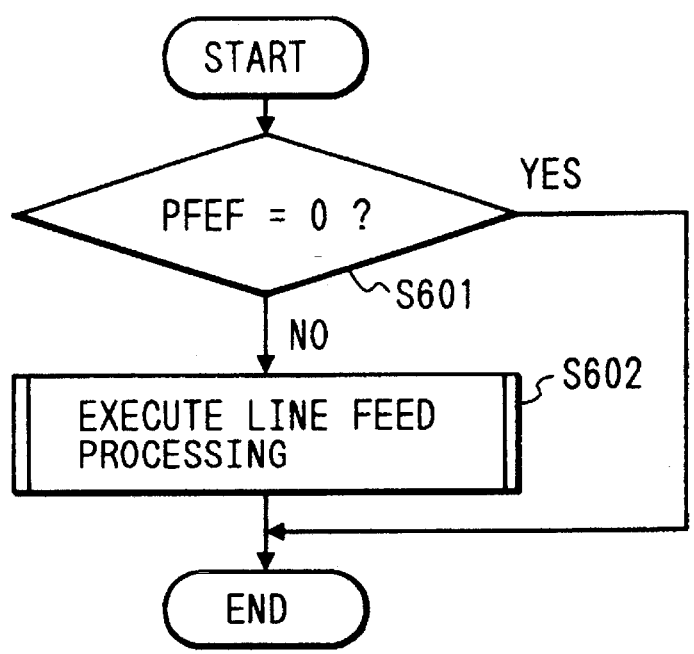
FIG. 23 is a flowchart for a printer side process for a line feed command.

FIG. 23 is a diagram showing a flow for processes on the printer side for a line feed command.

In the first step S601, the CPU #2 discriminates whether a paper feed enable flag is set to "0" or not. If YES in step S601, the processing routine is finished. If NO in step S601, step S602 follows. A line feeding process is executed in step S602.

Figure 24:
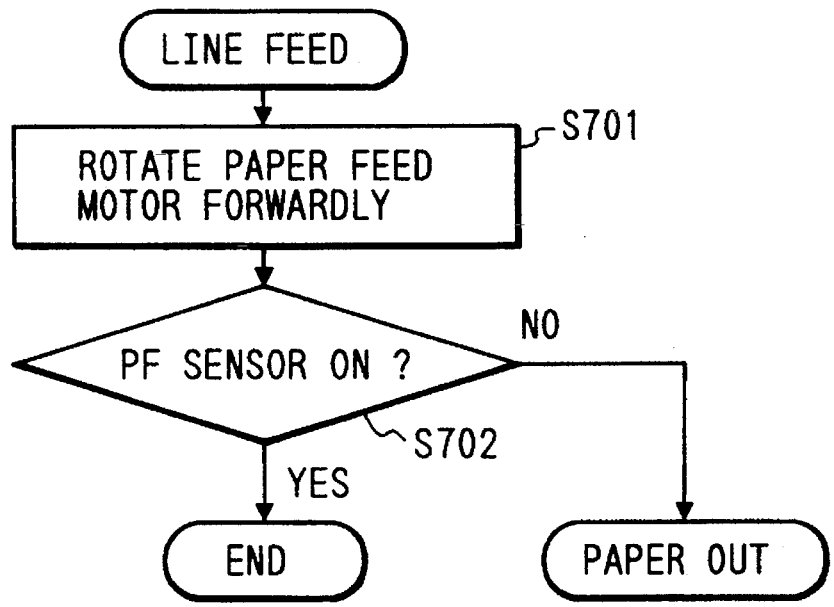
FIG. 24 is a flowchart for a line feeding process.

FIG. 24 is a diagram showing a flow for the line feeding process.

In step S701, the paper feed motor is forwardly rotated by an amount corresponding to 121 pulses. In step S702, the CPU #2 judges whether the paper has reached the paper sensor (PE) or not. If YES in step S702, the paper feed is finished. If NO in step S702, a buzzer sound or the like is generated to indicate a paper out error. However, a description in this case is omitted here.

A case where the processes in FIG. 20 are executed by the CPU on the host computer side is also considered. In this case, after the processes in FIG. 20 were executed, if it is determined by the CPU on the host computer side that the paper feed enable flag (PFEF) is equal to "0", the CPU on the host computer side does not issue the paper feed command and line feed command to the printer.

When the CPU on the host computer side decides that the paper feed enable flag (PFEF) is equal to "1", the CPU on the host computer side issues the paper feed command and line feed command to the printer. The CPU #2 on the printer side controls the paper feeding process in FIG. 22 and the line feeding process in FIG. 24.

(Second Embodiment)

It is also possible to accomplish further automation by adding an auto cut sheet feeder to the first embodiment. Since the control of the automatic cut sheet feeder is incorporated in the conventional technique, its detailed description is omitted.

(Third Embodiment)

Or, it is also possible to provide a stop key 106 in FIG. 1 to interrupt the printing operation to thereby enable the printing to be interrupted every line. In this case, by executing the processes in FIG. 20 every line, such a construction can be realized in a manner similar to the first embodiment. Therefore, its detailed description is omitted.

(Fourth Embodiment)

The process of the paper feed key in the first embodiment is controlled by the printer side instead of the host computer side, thereby reducing a load on the host computer side. In this case, an instruction is directly given from the paper feed key instead of the paper feed command from the host computer.

FIG. 25 is a diagram showing a control flow of the printer for a key input on the printer side in the fourth embodiment.

In the first step S800, the CPU #2 executes a key code obtaining process. In the next step S801, the CPU judges whether the key code of the input key coincides with the paper feed key code or not. If NO in step S801, a process corresponding to the paper feed key code is executed in step S802 and the processing routine is returned to step S800. If YES in step S801, step S803 follows. A check is made in step S803 to see if the paper sensor has been turned on or not. If NO in step S803, the paper feed command process is executed in step S804 and the processing routine is returned to step S800. If YES in step S803, step S805 follows. A check is made in step S805 to see if the paper feed key has been depressed for 1.5 seconds or more or not. If NO in step S805, the line feed command process is executed in step S806 and the processing routine is returned to step S800. If YES in step S805, a check is again made in step S807 to see if the paper sensor has been turned on or not. If NO in step S807, the processing routine is returned to step S800. If YES in step S807, the line feed command process is executed in step S808. A check is now made in step S809 to see if there is a key input or not. If NO in step S809, the processing routine is returned to step S807. If YES in step S809, the key code is obtained in step S810. A check is made in step S811 to see if the key code coincides with the paper feed key code or not. If NO in step S811, the processing routine is returned to step S807. If YES in step S811, the processing routine is returned to step S800. Since the key code obtaining process, paper feed command process, line feed command process, and the like are similar to those in the first embodiment, their descriptions are omitted here.

(Fifth Embodiment)

In the first and fourth embodiments, the paper feeding process is executed by depressing the paper feed key and the paper feeding operation can be stopped by further depressing the paper feed key. However, for example, it is also possible to construct in a manner such that when the paper feeding operation is stopped too late and the paper is excessively fed, by again depressing the paper feed key, the motor is reversely rotated in the process in FIG. 22, thereby allowing the paper to be reversely fed.

According to the invention as described above, the paper can be always fed without being aware of the on-line/off-line, and further, even in case of performing a line feed of a large amount, a smooth operation can be executed by a small number of key operations (key operation to discharge the paper to the outside of the apparatus+key operation to stop the paper discharge).

According to the invention, it is possible to construct a system of a very good operating efficiency such that the paper feed can be always performed and the line feeding operation can be executed by two key strokes.

According to the invention, it is possible to provide a printing apparatus comprising: the printing means for receiving data from the host computer and printing; the judging means for judging whether the printing means is printing or not; and the key input means for giving a paper feed instruction to the printing means, wherein when the paper feed instruction is given to the printing means by the key input means, the paper feed is controlled in accordance with the result of the judging means.

According to the invention, it is also possible to provide a printing apparatus comprising: the printing means for receiving data from the host computer and printing; and the key input means for giving the paper feed instruction to the printing means, wherein after the paper feed instruction was given by the key input means, the paper feed is controlled in accordance with another instruction of the key input means.

What is claimed is:

1. A print control apparatus for controlling print means which has an on-line mode and an off-line mode and, in the on-line mode, receives data from a host computer and executes data printing onto a recording medium based on the received data, said apparatus comprising:

memory means for storing identification information for identifying whether a print unit of the print means is executing the data printing onto the recording medium based on the received data;

determining means for determining whether the print unit of the print means is executing the data printing onto the recording medium based on the received data on the basis of the identification information stored in said memory means; and control means for, in the on-line mode, controlling the print means to execute a paper feed operation in the event that said determining means determines that the print unit of the print means is not executing the data printing onto the recording medium based on the received data and controlling the print means so as not to execute a paper feed operation in the event that said determining means determines that the print unit of the print means is executing the data printing onto the recording medium based on the received data.

2. An apparatus according to claim 1, further comprising means for automatically feeding a paper.

3. An apparatus according to claim 1, further comprising:

means for interrupting the printing means; and additional key input means for supplying an instruction to said interrupting means.

4. An apparatus according to claim 1, wherein the data is supplied from the host computer to the print means through an interface and the data is interrupted and is developed into a RAM through a memory controller.

5. An apparatus according to claim 1, wherein the print means comprises an ink jet printer.

6. An apparatus according to claim 1, further comprising key input means for instructing paper feed.

7. An apparatus according to claim 6, wherein the key input means is located ont he host computer.

8. An apparatus according to claim 6, wherein the key input means is located on the print means.

9. An apparatus according to claim 1, wherein the print means is formed integrally with the host computer.

10. A print control method for controlling print means which has an on-line mode and an off-line mode and, in the on-line mode, receives data from a host computer and executes data printing onto a recording medium based on the received data, said method comprising the steps of:

storing in memory identification information for identifying whether a print unit of the print means is executing the data printing onto the recording medium based on the received data;

determining whether the print unit of the print means is executing the data printing onto the record medium based on the received data on the basis of the identification information stored in memory; and controlling, in the on-line mode, the print means to execute a paper feed operation in the event that in said determining step it is determined that the print unit of the print means is not executing the data printing onto the recording medium based on the received data and controlling the print means so as not to execute a paper feed operation in the event that in said determining step it is determined that the print unit of the print means is executing the data printing onto the recording medium based on the received data.

11. A method according to claim 10, further comprising the step of interrupting the printing means in response to an instruction from additional key input means.

12. A method according to claim 10, wherein the data is supplied from the host computer to the print means through an interface and the data is interrupted and is developed into a RAM through a memory controller.

* * * * *

UNITED STATES PATENT AND TRADEMARK OFFICE
CERTIFICATE OF CORRECTION

PATENT NO. : 5,604,844
DATED : February 18, 1997
INVENTOR(S) : Masaki NISHIYAMA

It is certified that error appears in the above-indentified patent and that said Letters Patent is hereby corrected as shown below: On the title page:

<u>At [63] Related U.S. Application Data</u>
"Dec. 22, 1992." should read --Dec. 22, 1992, abandoned.--

<u>At [56] References Cited</u>
FOREIGN PATENT DOCUMENTS
"392371  4/1991  Japan
 3120131 5/1991  Japan" should read
--3-92371 4/1991 Japan
 3-120131 5/1991 Japan--.

<u>At [57] ABSTRACT</u>
Line 2, "printing" (first occurrence) should be deleted and "the" should be deleted.

<u>COLUMN 12</u>
Line 5, "ont he" should read --on the--.

Signed and Sealed this

Nineteenth Day of August, 1997

*Attest:*

BRUCE LEHMAN

*Attesting Officer*  Commissioner of Patents and Trademarks